United States Patent [19]
Shearn et al.

[11] Patent Number: 5,890,556
[45] Date of Patent: Apr. 6, 1999

[54] VEHICLE HOOD MOUNTING SYSTEM

[75] Inventors: Kenneth M. Shearn, Maple Valley; Eric J. Rickert, Seattle; Laurence S. Parfitt, Lynnwood, all of Wash.

[73] Assignee: PACCAR Inc, Bellevue, Wash.

[21] Appl. No.: 641,478

[22] Filed: May 1, 1996

[51] Int. Cl.$^6$ .................................................. B62D 25/12
[52] U.S. Cl. ..................... 180/69.21; 16/273; 267/141.2
[58] Field of Search ............................. 180/69.21, 69.22, 180/69.23; 267/141.2; 16/273, DIG. 6; 248/638

[56] References Cited

U.S. PATENT DOCUMENTS

| | | | |
|---|---|---|---|
| 4,097,958 | 7/1978 | Van Dell | 180/69.21 X |
| 4,382,482 | 5/1983 | Brandl et al. | 180/69.2 |
| 4,658,470 | 4/1987 | Oen | 180/69.21 |

FOREIGN PATENT DOCUMENTS

1302645  7/1962  France ................................ 180/69.21

*Primary Examiner*—F. J. Bartuska
*Attorney, Agent, or Firm*—Wells, St. John, Roberts, Gregory & Matkin, P.S.

[57] ABSTRACT

A hood mounting system and methods having compliant hinge assemblies mounted between frontal portions of a hood and the vehicle frame. Detachable mating members are also preferably included and mounted between rearward portions of the hood and the vehicle cab. Such mating members can also provide compliant connection. The hood hinge assemblies shown have a rocker member pivotally connected to a support member and at least one resilient member between the rocker member and the support member. A second pivot axis is also defined relative to the rocker member about which the hood pivots.

70 Claims, 7 Drawing Sheets

VEHICLE HOOD MOUNTING SYSTEM

TECHNICAL FIELD

This invention relates to vehicle hood mounting systems and related methods having compliance features to allow hood and cowl movement relative to the frame

BACKGROUND OF THE INVENTION

One previously known way of mounting a hood to a frame and cab of a truck is to utilize a four point hood mounting system Such systems are typically used on class 7 and 8 trucks, resulting in a cab to hood gap of approximately 25 mm. Such a large amount of hood to cowl spacing is required in order to accommodate up to approximately 22 mm of travel between the cab and frame due to deflection and other factors with a typical fully loaded chassis.

Air cab suspensions are typically included on modern trucks to produce an improved ride for the driver. Usually, the air cab suspension is mounted at the back of the cab and the cab pivots about a pivot axis near the front of the cab. The pivotal action of the cab occurs with respect to the vehicle frame. Movement of the cab relative to the frame causes the cowl to move fore and aft considerably in response to articulation of the suspension. As a result of this fore and aft bucking action, an undesirable large clearance gap is required between the back edge of the hood and the front edge of the cab.

A typical four point mounting system has two hinges mounted at the front corners of the hood. The hinges allow rotation of the hood relative to the frame, or chassis when opening and closing the hood. The rear of the hood is supported on pads located at the rear corners of the hood. The pads align the vertical position of the hood with the adjacent cab surfaces in a closed operating position. The pads also allow fore and aft translation of the hood relative to the cab to accommodate cab and frame deflection, particularly when the cab has a suspension system.

Another previously known way of mounting a hood to a frame and cab of a truck is to utilize an alternative four point mounting system. According to this construction, the mounting system has a pair of front hinges and a pair of rear elastomeric guide pins that align the hood with the cab in a desired operating position. Such a rear hood support system induces forces into the hood as the cab and hood try to move relative to each other. This loading can result in excessive loading on the hood and failure in extreme cases. It also has a negative impact on the cab ride due to restriction of the cab suspension.

Thus, there has remained a need for trucks having an improved hood and cab mounting system.

BRIEF DESCRIPTION OF THE DRAWINGS

Preferred embodiments of the invention are described below with reference to the accompanying drawings, which are briefly described below.

SUMMARY EXPLANATION OF INVENTION FEATURES

To assist in understanding and defining the invention, the description in this section indicates the various features of the invention in differing forms and manners of description. The novelty of the invention comprises one or more of the features described either in this section, or according to the more detailed description given in the next section.

In one aspect the invention includes a hood mounting system which can be more specifically described as a compliant hinge assembly mounted between a hood and a frame and a pair of detachable mating members mounted between a hood and a cab for positioning the hood relative to the cab, with the hinge assembly allowing the hood to move in compliant relationship relative to the frame. In another form the invention includes a vehicle which can be more specifically described as a frame, a cab carried by the frame, a hood carried by the frame and the cab, at least one hinge assembly mounted between a hood and the frame capable of compliant relative movement therebetween, and at least one pair of detachable mating members mounted between the hood and the cab to position the hood relative to the cab when engaged therebetween. In yet another form the invention includes a hood hinge assembly which can be more specifically described as a support member for mounting the hinge assembly to a vehicle frame, a rocker member pivotally connected to the support member along a first pivot axis, at least one resilient spacer member disposed between the rocker member and the support member so as to impart compliance therebetween, a bushing connected to the rocker member, and serving to define a second pivot axis, and a hood connection bracket pivotally connected to the bushing. Even furthermore, the invention includes a method for mounting a hood to a frame and a cab.

DETAILED DESCRIPTION OF THE PREFERRED EMBODIMENTS

This disclosure of the invention is submitted in furtherance of the objectives of patent laws to promote the progress of science, technology and the useful arts.

TABLE 1

Listing of Subsections of Detailed Description and
Pertinent Items with Reference Numerals and Page Numbers

| | | | |
|---|---|---|---|
| Overview | | 7 slotted aperture 82 | 13 |
| hood assembly 10 | 7 | heels 84 | 13 |
| vehicle 11 | 7 | bushing 86 | 14 |
| hood mounting system 12 | 7 | split sleeve 88 | 14 |
| hood 14 | 7 | retainer 90 | 14 |
| cowl, or A-pillar cover 16 | 7 | recess 92 | 14 |
| cab 18 | 7 | T-shaped slot 94 | 14 |
| chassis, or frame 20 | 7 | bolt 96 | 14 |
| hinge assemblies 22 | 7 | nut 98 | 14 |
| front cross member 24 | 7 | washer 100 | 14 |

TABLE 1-continued

Listing of Subsections of Detailed Description and
Pertinent Items with Reference Numerals and Page Numbers

| | | |
|---|---|---|
| frontal portion 26 | 7 | bolt 102 | 15 |
| mating members, or latch/guide | 7 | washer 104 | 15 |
| assemblies 28 | | washers 106 | 15 |
| rearward portion 30 | 7 | nut 107 | 15 |
| Vehicle Frame | 8 | arm 108 | 15 |
| frame rails 32 | 8 | mounting plate 110 | 15 |
| front drive brackets 34 | 8 | slotted apertures 112 | 15 |
| tow pin receivers 44 | 9 | slotted aperture 114 | 15 |
| Hood Spring Assemblies | 9 | depending bracket 116 | 15 |
| support arm 36 | 9 | slotted apertures 118 | 15 |
| spring assembly 38 | 9 | weld nuts 120 | 15 |
| latch assembly 40 | 9 | retaining bolts 119 | 15 |
| guide assembly 42 | 10 | washers 121 | 15 |
| Compliant Hood Hinge | 10 | reduced diameter portion 122 | 16 |
| Assemblies | | bore 124 | 16 |
| hood connection bracket 46 | 10 | trenches 126 | 16 |
| hinge assemblies 22 | 10 | sleeve 128 | 17 |
| latch retainers 48 | 10 | Detachable Coupling For | 19 |
| gap 50 | 11 | Hood-Cab Interface | |
| hood cross member 52 | 11 | pin 130 | 20 |
| forward mounting member 54 | 11 | hood bracket 132 | 20 |
| pivot mounts 56 | 12 | angle bracket 134 | 20 |
| shock absorber mounts 58 | 12 | guide member 136 | 20 |
| isolator assembly 60 | 12 | cowl bracket 138 | 20 |
| inner support bracket 62 | 12 | slotted apertures 140 | 20 |
| outer support bracket 64 | 12 | bolts 142 | 20 |
| rocker member 66 | 12 | washers 144 | 20 |
| rubber isolator 68 | 13 | nuts 146 | 20 |
| rubber isolator 70 | 13 | apertures 148 | 20 |
| bolt 72 | 13 | nut 150 | 21 |
| nut 74 | 13 | threaded stem 152 | 21 |
| washer 75 | 13 | enlarged shoulder 154 | 21 |
| bolts 76 | 13 | bolts 156 | 21 |
| nuts 78 | 13 | guide bracket 158 | 21 |
| washers 80 | 13 | Methods | 21 |

Overview

Figure 1:
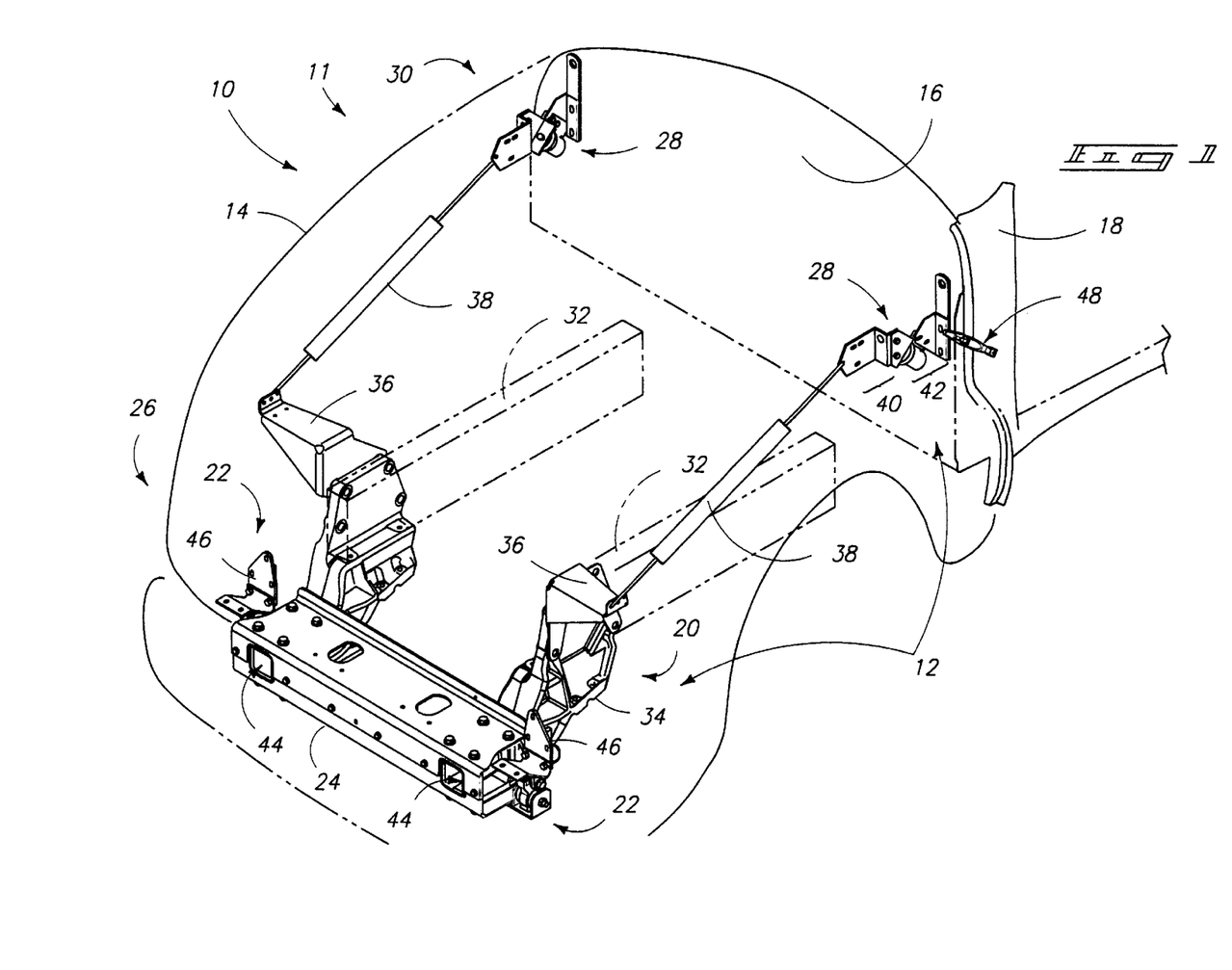
FIG. 1 is a perspective view of a hood assembly including a hood mounting system embodying this invention. The hood and portions of the frame and cab are shown in phantom.

Referring in more detail to the drawings, FIG. 1 is a perspective view illustrating a hood assembly 10 on a vehicle 11 including a hood mounting system 12 of this invention. The system is for supporting a hood 14 between a cowl, or A-pillar cover 16 of a vehicle cab 18 and a vehicle chassis, or frame 20. The hood mounting system 12 has a pair of novel hinge assemblies 22 mounted to a front cross member 24 of the vehicle chassis 20. The hinge assemblies 22 serve to pivotally mount a frontal portion 26 of hood 14 to the chassis 20. The system also preferably includes two pair of mating members, or latch/guide assemblies 28. These assemblies are provided in laterally spaced apart relation with mating parts which provide mechanical engagement between the cowl 16 of cab 18 and a rearward portion 30 of hood 14 when the hood is closed.

According to the hood mounting system 12 of this invention, a substantial amount of mechanical compliance is provided between hood 14 and frame 20. The most preferred form also provides a limited amount of compliance between the hood 14 and cab 18, even though they are secured together. The compliance provided by this system is desirable to accommodate roll, bucking and deflection of the cab and frame that can otherwise cause loading of the hood. A substantial amount of fore and aft compliance is provided, while additional compliance accommodates hood to frame yaw and roll. According to one construction as shown in FIG. 1, a fore and aft spring rate for the hood relative to the frame is approximately 250 lbs./inch, an up/down spring rate is 5800 lbs./inch, and a lateral spring rate is 2500 lbs./inch. Such a construction provides a rigid body natural frequency above 10–20 Hertz, and preferably in the range of 20–25 Hertz. Preferably, system 12 accommodates at least 2 degrees of yaw, 7 degrees of roll, and 15 mm of forward compliance, with little or no lateral compliance.

Vehicle Frame

Chassis 20 of FIG. 1 comprises a vehicle frame having a pair of longitudinally extending C-section shaped frame rails 32 and a corresponding pair of front drive brackets 34. One bracket 34 is mounted to the front end of each rail 32 with threaded fasteners, and cross member 24 is mounted between the pair of brackets 34 with threaded fasteners. In this manner, a rigid front structural member is formed by cross member 24. Member 24 is supported in a lowered configuration relative to rails 32, from brackets 34 so that it will align with the bumpers of smaller passenger vehicles.

Front cross member 24 is formed from top and bottom stamped steel sections that are secured together with a plurality of threaded fasteners. The fasteners extend through vertically extending apertures on each front drive bracket 34, as well as each section, on the top and bottom surfaces of each bracket 34. Additionally, threaded fasteners are used to secured the sections together along a front vertical face of member 24.

A pair of tow pin receivers 44 are formed from each front drive bracket 34 to enable vehicle towing while maintaining a clean and aerodynamic bumper profile. A tow pin (not shown) is removably received in each receiver 44 when it becomes necessary to tow the vehicle 11. Typically, a removable retaining pin (not shown) retains the pin in the receiver. Apertures are also formed in the front vertical face of cross member 24, enabling access to receivers 44. Similarly, apertures (not shown) are provided in a bumper facia portion of hood 14.

Hood Spring Assemblies

A support arm 36 is mounted to the top of each bracket 34 with the same threaded fasteners, or bolts that are used to mount bracket 34 to each rail 32. To reduce weight while providing a rigid support, arm 36 is formed from a stamped section of sheet metal. Arm 36 is configured to support one end of a spring assembly 38. The other end mounts to the rearward portion 30 of hood 14, producing a compressive force that counteracts the weight of the hood when it is being opened and closed. A latch assembly 40 is mounted to the other end of each spring assembly 38 to facilitate attachment of hood 14 to cab 18. Latch assembly 40 removably mates with a complementary guide assembly 42 that is mounted to cowl 16 on either side. Latch assembly 40 and guide assembly 42 together form a pair of the mating members 28.

Spring assembly 38 is formed from a pair of end rods that are coupled together with a mechanical coil spring that is under compression, in the position shown in FIG. 1. The spring is contained within a tubular housing, or can. Alternatively, a gas or pneumatic spring can be used in place of a coil spring. Preferably, spring assembly 38 causes the effective force necessary to lift hood 14 to be about 30 lbs. force. A similar force is needed to close hood 14.

Compliant Hood Hinge Assemblies

Figure 2:
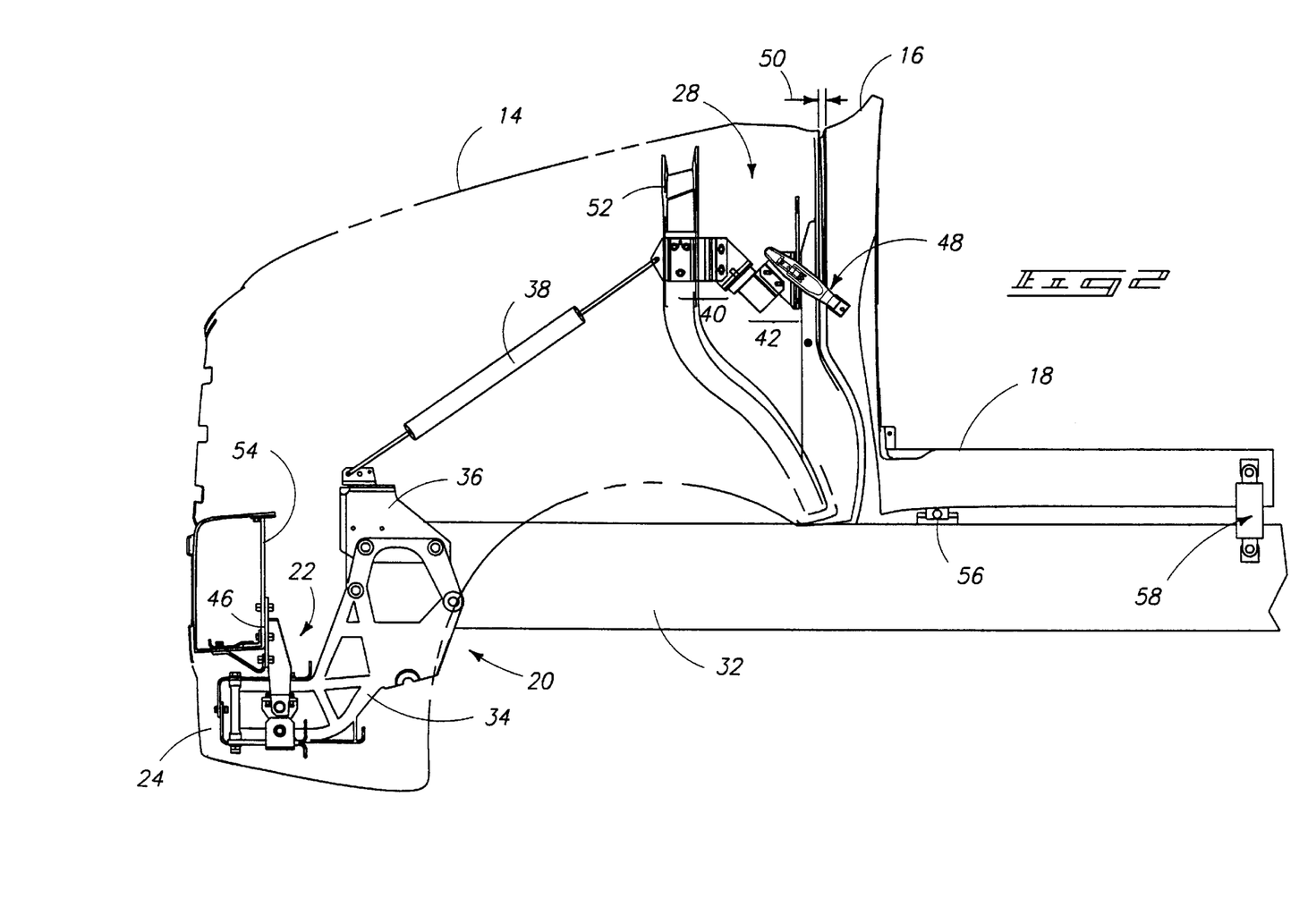
FIG. 2 is a side elevational view of the hood assembly of FIG. 1. The hood is shown in phantom in a lowered, closed position.

A hood connection bracket 46 is connected to the hood. The brackets 46 form part of hinge assemblies 22 which are connected at each end of cross member 24 to pivotally support frontal portions 26 of hood 14. Bracket 46 forms the upper part of hinge assembly 22. A lower part of assembly 22 forms a compliant and pivotable mount to which bracket 46 is connected. The compliance at the front hood mounts allow hood 14 to be securely mounted to cab 18. This is advantageously done using the pair of mating members 28 and a pair of accompanying hood latch retainers 48. As shown, each latch retainer 48 is formed from a rubber hold down strap that is mounted to cab 18 and a mating hook configured to removably engage with the strap that is mounted to hood 14, As shown in FIG. 2, a gap 50 is formed between hood 14 and cowl 16 of cab 18 when hood 14 is securely fastened in a lowered position with retainers 48. An attempt is made to minimize the size of gap 50 for aesthetics and aerodynamics. With the provision of compliant hinge assemblies 22, the hood to cab gap 50 can be minimized to allow the cab to snub the hood forward prior to contact between the cab and the hood. Mating members 28 and compliant hinge assemblies 22 will allow hood 14 to move forward without excessive loading of the hood in compression when the cab snubs the hood forward. Cab 18 can buck forward about 22 mm, and the hood to cab gap 50 can be set at about 16 mm maximum and 13 mm minimum. In this manner, hood 14 will snub forward to a 6 mm gap. Compliant hinge assemblies 22 will allow for about 12 mm to 14 mm forward movement of hood 14. In this manner, compliance in the hood mounting system means that the system will not restrain cab 18 nor interfere with its desired suspension characteristics.

As shown in FIG. 2, hood 14 has a hood cross member 52 and a forward mounting member 54 affixed along the inner surface to enforce the hood. Typically, hood 14, cross member 52, and a pair of laterally spaced apart mounting members 54 are formed from composite plastic material, such as sheet molding compound (SMC). Alternatively, fiberglass, various other composite materials, and even sheet metal can be used to form hood 14.

Figure 3:
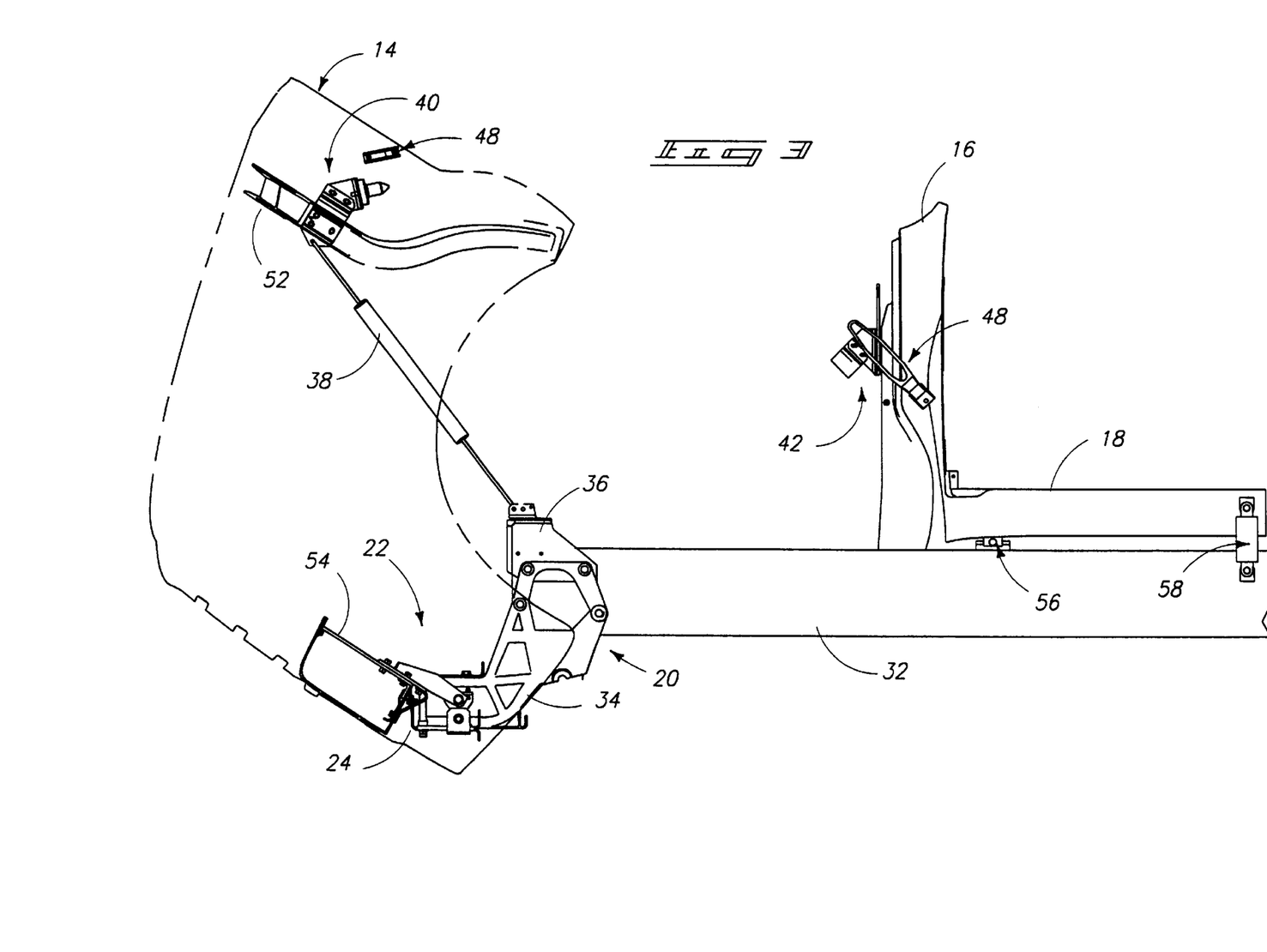
FIG. 3 is a side elevational view corresponding to that of FIG. 2, but with the hood illustrated in a raised, open position.

According to FIG. 2, a significant problem is presented by the fact that cab 18 is mounted to frame rails 32 via a suspension, causing movement of cowl 16 fore and aft. Namely, cab 18 is mounted to rails 32 via a forward positioned pair of pivot mounts 56 and a rearward positioned pair of shock absorber mounts 58. Typically, mounts 58 include a spring and a damper element for isolating shock from being transmitted to cab 18 from frame 20. This problem results in the above-mentioned snubbing of hood 14 overcome by the device of this invention, As shown in FIG. 3, hood 14 is raised to an open position with the assistance of the pair of mechanical spring assemblies 38. Hinge assembly 22 is shown pivoted to a forward position, with forward mounting member 54 and hood 14 caused to be positioned in corresponding rotated positions. Latch retainer 48 is shown in an unfastened, or decoupled configuration, with the rubber holddown strap being affixed to cab 18 and the mating hook being affixed to hood 14, on each side. Furthermore, latch assembly 40 and guide assembly 42 can be seen in their separated, or decoupled configurations.

Figure 4:
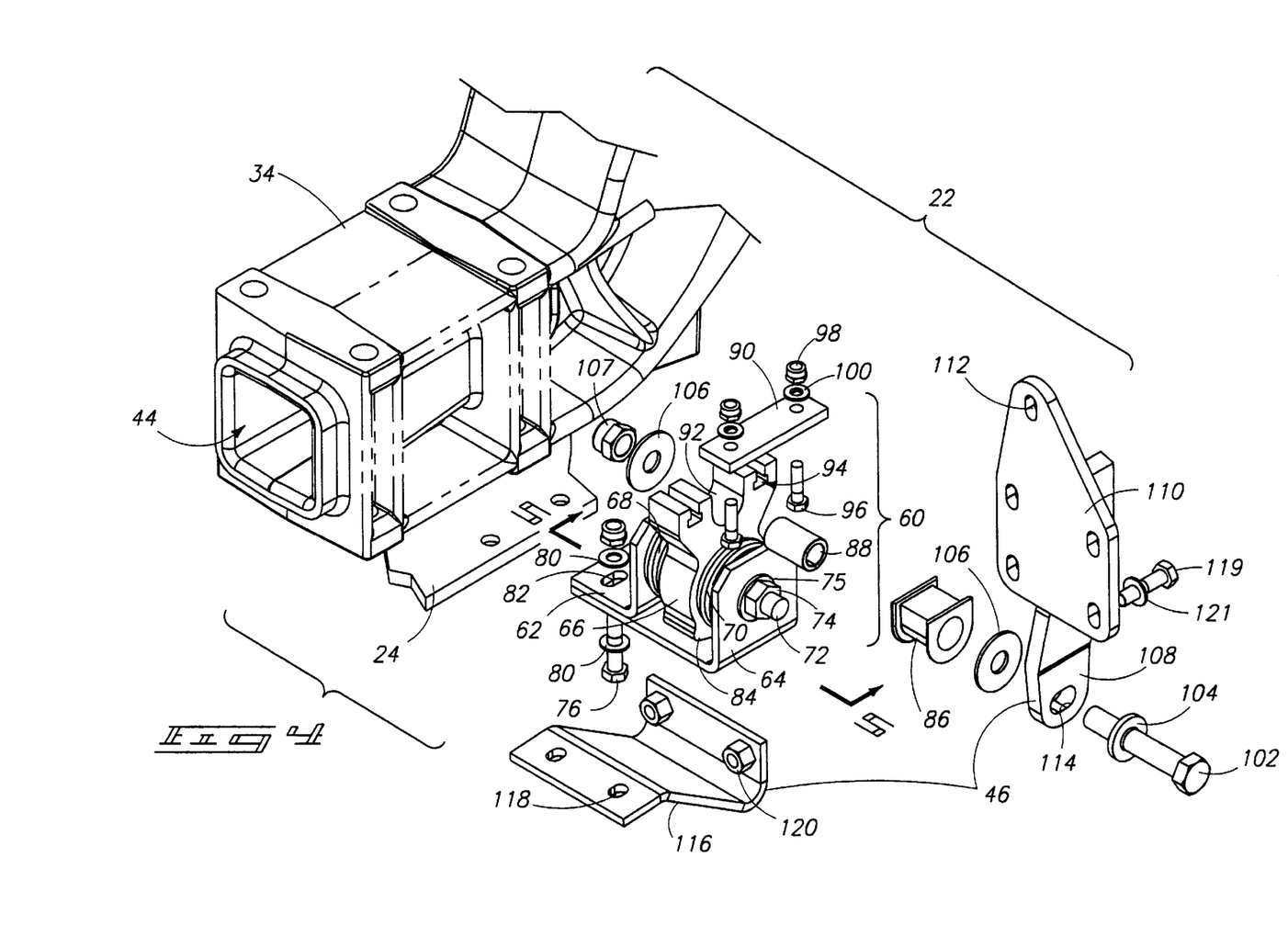
FIG. 4 is an enlarged exploded perspective view of a hinge assembly used on the hood mounting system of FIGS. 1–3.

FIG. 4 depicts hinge assembly 22 in exploded perspective view. Hinge assembly 22 is formed from an isolator assembly 60 having an inner support bracket 62 and an outer support bracket 64 fastened together and mounted to crossmember 24. Inner bracket 62 and outer bracket 64 pivotally support a rocker member 66 relative to brackets 62 and 64. Rocker member 66 is compliantly mounted to brackets 62 and 64 via a first rubber isolator 68 and a second rubber isolator 70. Rocker member 66 and isolators 68 and 70 are mounted between brackets 62 and 64 with a bolt 72, a nut 74, and a washer 75. In this manner, rocker motion of member 66 and compliance of isolators 68 and 70 allow fore and aft movement of an upper portion of member 66, as well as off-axis twisting that produces yaw and roll, providing a compliant isolator mount between the hood and frame. Isolators 68 and 70 are preferably constructed from rubber, with a durometer value in the range of 80–90.

Isolator assembly 60 is removably fastened to front crossmember 24 of the vehicle frame with a pair of bolts 76, nuts 78, and washers 80. Each bolt 76 is received through a slotted aperture 82 formed in each of brackets 62 and 64 to enable fore and aft positioning of assembly 60 along front drive bracket 34. In this manner, a hood mounted to brackets 46 can be aligned in assembly to the vehicle, enabling accurate fixturing therebetween.

Rocker member 66 of FIG. 4 has a pair of heels 84 formed along a bottom portion. Each heel 84 is disposed laterally of a central axis (not shown) of a bore in rocker member 66 that receives bolt 72. The pair of heels are constructed and arranged to engage with the support member formed by brackets 62 and 64 when rocker member 66 is pivoted between fore and aft positions. Heels 84 limit the amount of pivotal rocker motion of rocker member 66 in relation to support bracket 64. Bolt 72 is received through the bore (not shown) in a central portion of member 66. An upper portion of rocker member 66 supports a bushing 86 and a split sleeve 88 that are secured to member 66 with a retainer 90 within a recess 92. Recess 92 is formed within a clevis-shaped upper portion of member 66, and is configured to receive the hood connection bracket 46 along a first pivot axis, inside bushing 86, forming a second pivot axis therealong.

A T-shaped slot 94 is formed in member 66 on each side of recess 92 to facilitate retention of bushing 86, sleeve 88, and hood connection bracket 46 within recess 92. A head portion of a bolt 96 is retained within each slot 94, with retainer 90 being received over the opposite end of bolt 96 where it is secured with a nut 98 and a washer 100. In this manner, enlarged end portions on bushing 86 ensure that it is entrapped, or retained between retainer 90 and member 66.

Bushing 86 is formed from a tough yet slightly elastomeric material such as polyurethane in order to provide a low-friction mount for pivotally supporting the hood via hood connection bracket 46. Bushing 86 forms a pivot mount that connects with rocker member 66 for supporting a second pivot point. Bushing 86 has a higher durometer value than isolators 68 and 70, and serves principally to provide a low friction surface having only nominal compliance. Compression sleeve 88 is formed from a rolled piece of steel, having a longitudinal split where the rolled sleeve comes together. Such a construction reduces the cost, eliminating the need to form sleeve 88 from a cylindrical piece of metal. Alternatively, sleeve 88 can be formed from a cylindrical piece of metal.

In assembly, sleeve 88 is compressively engaged by a bolt 102 and a washer 104, between a pair of washers 106. Bolt 102 securely retains bracket 46 between washer 104 and outer washer 106 when a nut 107 is secured to the opposite end. Sleeve 88 positions washers 106 in spaced apart relation relative to the thickness of bushing 86 so as to ensure smooth rotation of sleeve 88 and washers 106 relative to bushing 86. In this manner, a low friction pivot is formed between sleeve 88 and bushing 86 for retaining a hood (not shown) affixed to bracket 46 with a vehicle frame.

To facilitate attachment and fixturing of a hood to bracket 46, bracket 46 is formed from an arm 108 that carries a mounting plate 110 configured to fasten to the hood. Plate 110 has a plurality of slotted apertures 112 configured to receive mounting bolts that secure bracket 46 to the hood. Additionally, a slotted aperture 114 is formed in arm 108 for receiving bolt 102 in assembly. Aperture 114 is slotted so as to accommodate fore and aft adjustment when fixturing and aligning a hood carried by brackets 46 with a cab and a frame. Furthermore, bracket 46 includes a removable depending bracket 116 having a plurality of slotted apertures 118 for mounting to the hood. A pair of spaced apart weld nuts 120 are attached to bracket 116 behind associated clearance apertures in the bracket configured to receive retaining bolts 119 and associated washers 121. The relative positions of bracket 116 and plate 112 can be adjusted by positioning bolts 119 within a desired location of slotted apertures 112, prior to tightening the bolts.

Figure 5:
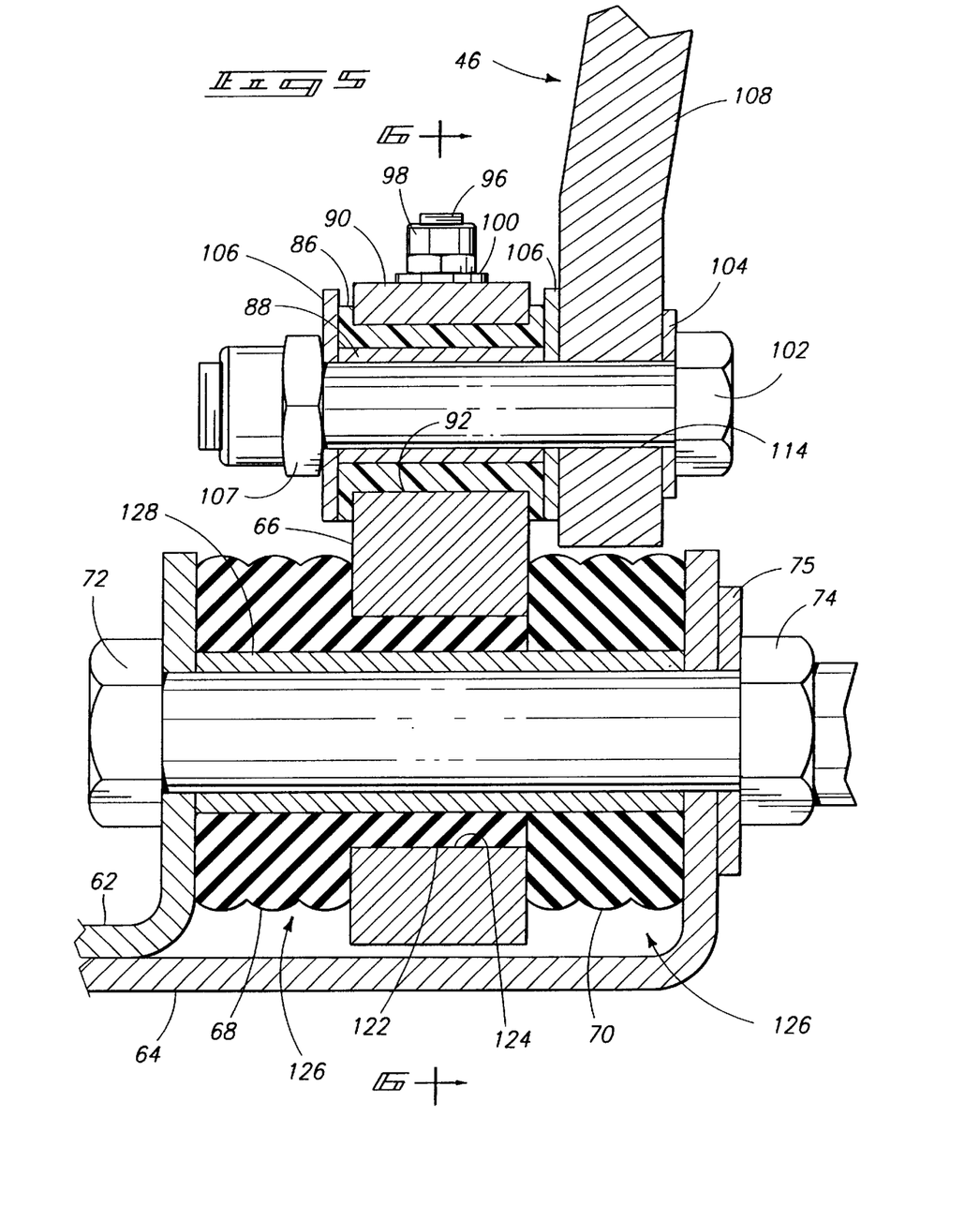
FIG. 5 is a sectional view taken along line 5—5 of FIG. 4 depicting the hinge assembly in an assembled configuration.

FIG. 5 illustrates hood hinge assembly 22 according to an assembled vertical cross-sectional view Assembly 22 mounts a hood to a frame of a vehicle to provide a compliant relationship therebetween which allows at least fore and aft relative movement. As shown in FIG. 5, brackets 62 and 64 form a support member for mounting the hinge assembly 22 to a vehicle frame. Bolt 72 forms the pivot axis about which rocker member 66 pivotally connects to the support member, or brackets 62 and 64. Rubber isolators 68 and 70 form resilient spacer members that are disposed between the rocker member 66 and the support member brackets 62 and 64. In operation, isolators 68 and 70 impart compliance between bolt 102 and bolt 72. Bushing 86, sleeve 88, washers 106, and bolt 102 cooperate in assembly to form a pivot mount that pivotally connects arm 108 to rocker member 66. Arm 108 forms part of the hood connection bracket 46 which pivots to enable opening and closing of a hood attached thereto.

A reduced diameter portion 122 is formed by isolator 68, extending within an oversized bore 124 in rocker member 66 to compliantly isolate member 66 from bolt 72 and brackets 62 and 64. Preferably, each isolator has a plurality of circumferentially extending trenches 126 formed about an outer diameter portion. Trenches 126 function to form regions having enhanced compliance along the outer surface of each isolator 68 and 70. A steel compression sleeve 128 extends through an inner diameter bore of isolators 68 and 70, between brackets 62 and 64. Sleeve 120 functions to maintain spacing between brackets 62 and 64, resulting in controlled compression with rocker member 66 via isolators 68 and 70. Compression of isolators 68 and 70 ensures firm but compliant mounting of member 66 between brackets 62 and 64.

According to FIG. 5, construction of a hinge assembly is shown having a first part, or bracket 46 mounted to a hood, and a second part, or isolator assembly 60 mounted to a vehicle frame. Bracket 46 and isolator assembly 60 are capable of compliant relative movement therebetween in at least a fore and aft direction. Preferably, a pair of hinge assemblies 22 are carried in laterally spaced apart relation by a vehicle frame. The pair of hinge assemblies 22 are constructed and arranged to pivotally support the hood so as to facilitate access to an engine compartment defined at least in part below the hood.

Figure 6:
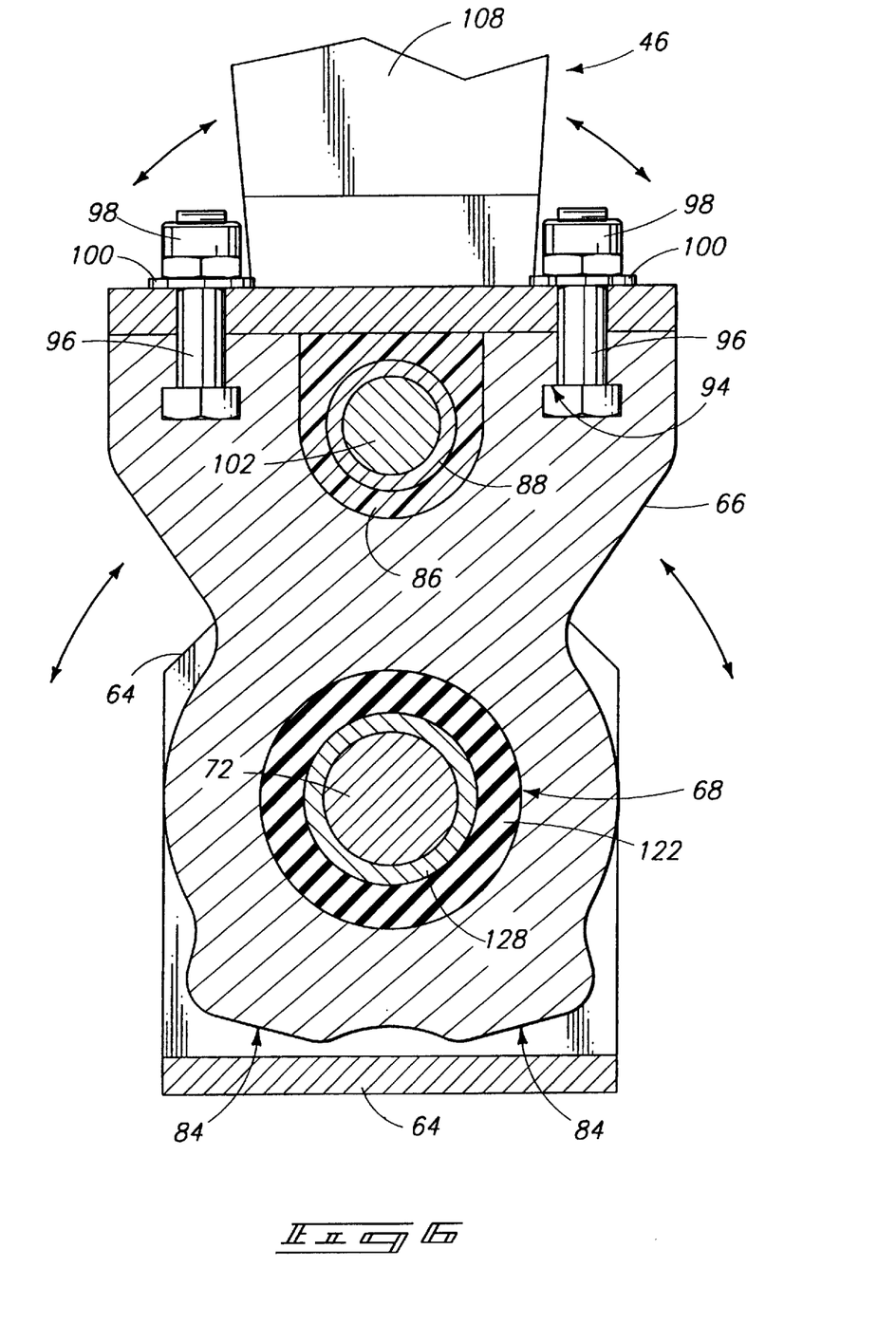
FIG. 6 is a cross-sectional view taken along line 6—6 of FIG. 5.

FIG. 6 illustrates hood hinge assembly 22 according to an assembled vertical cross-sectional view taken perpendicular to that shown in FIG. 5. Namely, the pivotal mounting of bracket 46 to rocker member 66 can be readily seen. Additionally, the compliant fore and aft movement of bracket 46 along the axis of bolt 102 can be seen, as rocker member 66 rocks about the axis of bolt 72. Furthermore, the resilience of rubber portion 122 of isolator 68 imparts compliance between bolt 72 and rocker member 66. Such compliance also enables accommodation of yaw and roll when mounting a hood to a cab and a frame.

An additional feature of rocker member 66 is provided by the placement of heels 84 along the bottom portion of member 66. Heels 84 are configured to contact a top surface of support bracket 64, limiting the fore and aft pivoting of member 66. Hence, each heel provides a stop, or abutment that engages with bracket 64 to limit pivotal movement of member 66. The overall fore and aft movement of bolt 102 (the second pivot), resulting at least in part from rocker motion of rocker member 66, is preferably limited by contact between heels 84 and bracket 64 to a maximum of about 1.5 inches.

In addition to the advantages explained elsewhere herein, the compliant hood hinge assemblies 22 include features which facilitate easy maintenance of the vehicle, particularly when such maintenance requires removal of the hood for better access. For example, major engine work or removal of the heat exchangers positioned directly behind the hood oftentimes is facilitated by removing the hood from the vehicle. Prior hood mounting systems typically mounted the hood in such a manner that complete adjustment of the hood position and alignment might be needed if the hood was removed. This is a relatively costly maintenance procedure unto itself. Thus mechanics frequently do not remove hoods, even though they present a serious impediment to their work.

The hinge assemblies 22 include a retainer 90 which can be easily removed by detaching fasteners 98. After the retainer is removed, the pivots including pivot bolts 102, bushings 86 and related parts along with the hood can simply be lifted from their supported position upon the yoke shaped rocker piece 66. This allows the entire hood assembly to lifted from the front of the vehicle. Most importantly, the hood assembly can be easily reset into the same location without the need for costly realignment and adjustment. The factory-adjusted hood positioning determined by rocker piece 66 is still maintained and the hood assembly is simply repositioned thereinto and returned to an assembled condition. This greatly reduces hood reinstallation costs.

Detachable Coupling For Hood-Cab Interface

Figure 7:
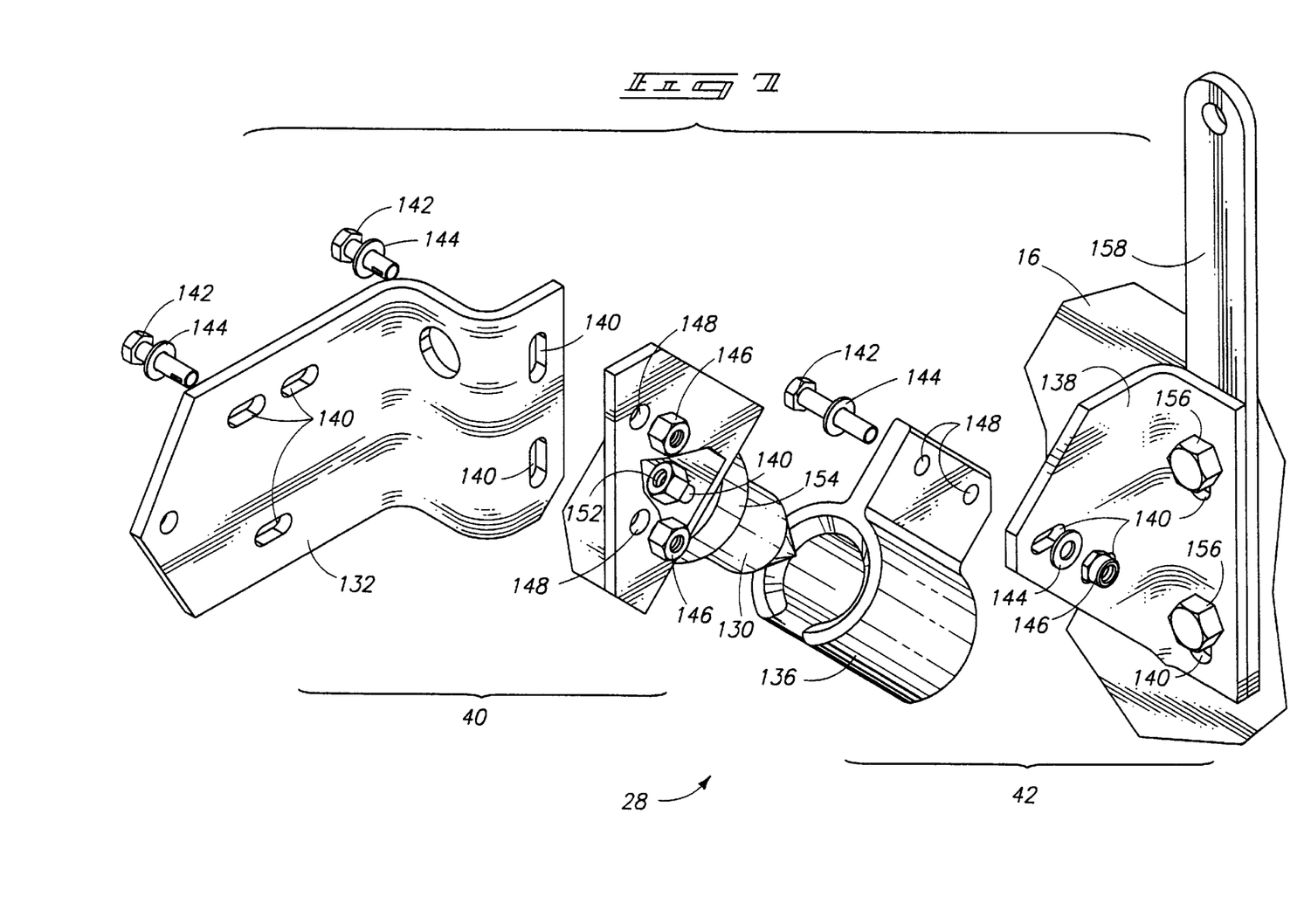
FIG. 7 is an enlarged exploded perspective view of the latch assembly of FIGS. 1–3.

FIG. 7 illustrates the construction of a preferred detachable coupling which includes a pair of mating members 28. The detachable mating member pairs preferably form latch/guide assemblies 28 which positionally coordinate and mechanically couple the hood to the cab (as shown in FIG. 1). Latch assembly 40 is mounted to member 52 (of FIG. 2). Similarly, guide assembly 42 is mounted to cowl 16 of a vehicle cab. Latch assembly 40 forms a first mating member which is mounted to a rearward portion of a vehicle hood. Guide assembly 42 forms a second mating member which is mounted to a vehicle cab. The first and second mating members are detachable into disengaged relative positions to allow the hood is be opened and moved into engaged positions when the hood is closed. In operation, the first and the second mating members provide engagement therebetween when in the engaged relative positions to thereby position the hood relative to the cab. The pair of hinge assemblies allows the hood to move in compliant relationship relative to the vehicle frame.

Latch assembly 40 includes a pin 130 that forms a compliant male member sized to mate within guide assembly 42. A hood bracket 132 is mounted to the hood. An angle bracket 134, carrying pin 130, mounts to the hood bracket 132. To enable compliance during hood yaw and roll, pin 130 is formed from a resilient material such as polyurethane that imparts compliance to the pin as it mates with guide member 136.

Guide assembly 42 includes a guide member 136 that forms a female member sized to receive pin 130. A cowl bracket 138 mounts to cowl 16 of a vehicle cab. Guide member 136 is mounted to cowl bracket 138.

To facilitate alignment between pin 130 and guide member 136, the components of latch assembly 40 and guide assembly 42 have alignment features that enable relative alignment therebetween during assembly. A plurality of slotted apertures 140 are formed in bracket 132 enabling positioning of bracket 132 before securing it in place to a hood with bolts 142, washers 144 and nuts 146. Similarly, a pair of apertures 140 are formed in bracket 132 for securing bracket 134 to bracket 132 in relative alignment. A plurality of apertures 148 in bracket 134 receive bolts 142, washers 144 and nuts 146. Additionally, pin 130 is mounted to bracket 134 via a slotted aperture 140 with a nut 150 being received on An enlarged 152 extending from pin 130.

An enlarged shoulder 154 formed on pin 130 limits the depth of insertion of an elongate mating portion on pin 130 within guide member 136. Additionally, shoulder 154 functions as a resilient snubber, preventing hard contact between latch assembly 40 and guide assembly 42. Hence, a limited amount of compliance is provided between assemblies 42 and 44, while essentially retaining them together in substantially non-translating relation. Such compliance enables accommodation of twisting that can occur between a hood and cowl due to yaw and roll therebetween. Additionally, guide member 136 is mounted in alignable fashion to bracket 138 by securing them together via apertures 140 and 148, bolts 142, washers 144, and nuts 146. Finally, bracket 138 is secured to cowl 16 with bolts 156 being received in alignable fashion within slotted apertures 140.

A guide bracket 158 is also mounted to cowl 16 with bolts 156, behind bracket 138. Guide bracket 158 functions to mount accessory components within the engine compartment.

Methods

Additional aspects of this invention include novel methods of mounting a hood to a frame and a cab carried by the frame. The method includes the step of mounting a rearward portion of the hood to secure the hood in engaged relative position with the cab. The method also includes the step of mounting frontal portions of the hood and frontal portions of the frame in compliant relative movable relation therebetween in at least fore and aft directions.

The invention has been described in language more or less specific as to structural, methodological, or other aspects and features. It is to be more properly understood that the invention is not necessarily limited to the specific forms shown and described. Other equivalent structures and features may also be within the inventive concepts which are appropriately protected under the grant of patent rights being sought. The invention is therefore being claimed in an effort to define the invention but the various forms or modifications which the invention may take is difficult or impossible to define with certainty. Judgement must be utilized to properly interpret the scope of protection which is to be appropriately applied with regard to these new and inventive concepts.

We claim:

1. A hood mounting system for use in mounting a hood to a vehicle, the vehicle having a frame and a cab, comprising:

at least one hinge assembly mounted between frontal portions of the hood and frontal portions of the frame; said at least one hinge assembly having first and second parts which are capable of substantial compliant relative movement therebetween in response to relative movements between the hood and frame during travel of the vehicle upon a roadway, said substantial compliant relative movement being in at least fore and aft directions to allow the hood to move relative to the frame in at least the fore and aft directions during said travel upon a roadway;

at least one pair of mating members, said at least one pair of mating members including a first mating member which is mounted to a rearward portion of the hood and a second mating member which is mounted upon the cab; said first and second mating members being disengaged when the hood is in an open position and engaged when the hood is in a closed position, is said first and second mating members positioning the hood relative to the cab when the first and second mating members are engaged;

whereby the first and the second mating members engage when in the engaged relative positions to thereby position the hood relative to the cab, and the at least one hinge assembly allows the hood to move in substantial compliant relationship relative to the frame.

2. The hood mounting system of claim 1 wherein the at least one hinge assembly comprises a pair of laterally spaced apart hinge assemblies carried by the frame and constructed and arranged to pivotally support the hood so as to facilitate access to an engine compartment defined at least in part therebelow.

3. The hood mounting system of claim 1 wherein the hinge assembly comprises a compliant isolator mount that allows at least fore and aft relative movement between the hood and the frame.

4. The hood mounting system of claim 3 wherein the compliant isolator mount further provides yaw and roll compliance between the hood and the frame.

5. The hood mounting system of claim 1 wherein the first and second mating members comprise a pair of mating male and female members, respectively.

6. The hood mounting system of claim 5 wherein the first mating member comprises a compliant pin and the second mating member comprises a complementary guide member.

7. The hood mounting system of claim 1 wherein the mating members comprise two laterally spaced apart pairs of first and second mating members.

8. The hood mounting system of claim 7 further comprising a hood latch retainer constructed and arranged to retain the hood in a lowered position, maintaining engagement of the pairs of first and second mating members.

9. The hood mounting system of claim 1 further comprising a hood latch retainer having a holddown strap and a hook, the strap and the hook constructed and arranged to releasably retain the first and the second mating members in compliant nested engagement therebetween, one of the strap and the hook being mounted to the cab and the other of the hook and the strap being mounted to the hood.

10. The hood mounting system of claim 1 wherein the hood and a cowl of the cab form an exterior gap therebetween, with the hood lowered and the pair of mating members engaged, in the range between 6 mm and 16 mm.

11. The hood mounting system according to claim 1 wherein the hinge assembly includes a rocker member pivotally connected to the hood.

12. The hood mounting system according to claim 1 wherein the hinge assembly includes a rocker member pivotally connected to the frame.

13. The hood mounting system according to claim 1 wherein the hinge assembly includes a rocker member pivotally connected to the hood and the frame.

14. The hood mounting system according to claim 1 wherein the hinge assembly includes a rocker member pivotally connected to the frame, the rocker member including at least one heel configured to limit pivotal movement of the rocker member with respect to the frame.

15. The hood mounting system according to claim 1 wherein the hinge assembly includes:

a support member connected to the frame;

a rocker member pivotally connected to the support member;

a resilient spacer intermediate the rocker member and the support member to provide compliance therebetween.

16. The hood mounting system according to claim 1 wherein the hinge assembly includes:

a support member connected to the frame;

a rocker member pivotally connected to the support member and the hood;

a resilient spacer intermediate the rocker member and the support member to provide compliance therebetween.

17. The hood mounting system according to claim 1 wherein the hinge assembly includes:

a support member connected to the frame;

a rocker member pivotally connected to the support member and the hood, the rocker member including at least one heel configured to limit pivotal movement of the rocker member with respect to the frame; and a resilient spacer intermediate the rocker member and the support member to provide compliance therebetween.

18. The hood mounting system according to claim 1 wherein the hinge assembly includes a rocker member pivotally connected to the frame and the hood at two pivots, and at least one resilient member between the rocker member and at least one of said two pivots.

19. The hood mounting system according to claim 1 wherein the hinge assembly includes a rocker member pivotally connected to the frame and the hood at two pivots, and resilient members between the rocker member and said two pivots.

20. The hood mounting system according to claim 1 wherein the first and second mating members are configured to maintain a distance intermediate the hood and the cab during movement of the vehicle.

21. The hood mounting system according to claim 1 wherein the hinge assembly allows the hood to move in compliant relationship relative to the frame responsive to a force experienced by the hood as applied at least partially by the mating members.

22. The hood mounting system according to claim 1 wherein the compliant relative movement reduces loading of the hood.

23. A hood mounting system for use in mounting a hood to a vehicle, the vehicle having a frame and a cab, comprising at least one hinge assembly mounted between frontal portions of the hood and frontal portions of the frame; said at least one hinge assembly having first and second parts which are connected by at least one member which allows substantial compliant relative movement therebetween in at least fore and aft directions whereby the at least one hinge assembly allows the hood to move in compliant relationship relative to the frame in at least the fore and aft directions while the vehicle is moving upon a roadway.

24. The hood mounting system according to claim 23 wherein the hinge assembly allows the hood to move relative to the frame responsive to a force experienced by the hood.

25. The hood mounting system according to claim 23 wherein the compliant relative movement reduces loading of the hood.

26. The hood mounting system according to claim 23 wherein the hinge assembly includes a rocker member pivotally connected to the hood.

27. The hood mounting system according to claim 23 wherein the hinge assembly includes a rocker member pivotally connected to the frame.

28. The hood mounting system according to claim 23 wherein the hinge assembly includes a rocker member pivotally connected to the hood and the frame.

29. The hood mounting system according to claim 23 wherein the hinge assembly includes a rocker member pivotally connected to the frame, the rocker member including at least one heel configured to limit pivotal movement of the rocker member with respect to the frame.

30. The hood mounting system according to claim 23 wherein the hinge assembly includes:

a support member connected to the frame;

a rocker member pivotally connected to the support member;

a resilient spacer intermediate the rocker member and the support member to provide compliance therebetween.

31. The hood mounting system according to claim 23 wherein the hinge assembly includes:

a support member connected to the frame;

a rocker member pivotally connected to the support member and the hood;

a resilient spacer intermediate the rocker member and the support member to provide compliance therebetween.

32. The hood mounting system according to claim 23 wherein the hinge assembly includes:

a support member connected to the frame;

a rocker member pivotally connected to the support member and the hood, the rocker member including at least one heel configured to limit pivotal movement of the rocker member with respect to the frame;

a resilient spacer intermediate the rocker member and the support member to provide compliance therebetween.

33. The hood mounting system according to claim 23 wherein the hinge assembly includes a rocker member pivotally connected to the frame and the hood at two pivots, and at least one resilient member between the rocker member and at least one of said two pivots.

34. The hood mounting system according to claim 23 wherein the hinge assembly includes a rocker member pivotally connected to the frame and the hood at two pivots, and resilient members between the rocker member and said two pivots.

35. A vehicle comprising:

a frame;

a cab carried by the frame;

a hood carried by the frame and the cab;

at least one hinge assembly mounted between frontal portions of the hood and frontal portions of the frame; said at least one hinge assembly having first and second parts which respectively comprise an isolator assembly and a hood connection bracket capable of compliant relative movement therebetween in at least fore and aft directions, the isolator assembly being configured to pivotally carry the hood connection bracket;

at least one pair of mating members, said at least one pair of mating members including a first mating member which is mounted to a rearward portion of the hood and a second mating member which is mounted upon the cab; said first and second mating members being detachable into disengaged relative positions when the hood is opened and moved into engaged relative positions when the hood is closed;

whereby the first and the second mating members provide engagement therebetween when in the engaged relative positions to thereby position the hood relative to the cab, and the at least one hinge assembly allows the hood to move in compliant relationship relative to the frame.

36. The vehicle of claim 35 wherein the at least one hinge assembly comprises a pair of laterally spaced apart hinge assemblies carried by the frame and constructed and arranged to pivotally support the hood so as to facilitate access to an engine compartment defined at least in part therebelow.

37. The vehicle of claim 35 wherein the hinge assembly comprises a compliant isolator mount that allows at least fore and aft relative movement between the hood and the frame.

38. The vehicle of claim 35 wherein the first and second mating members comprise a pair of mating male and female members, respectively.

39. The vehicle of claim 35 wherein the first mating member comprises a compliant pin and the second mating member comprises a complementary guide member.

40. The vehicle of claim 35 wherein the male member comprises an elastomeric pin body having an elongate mating portion and an enlarged shoulder portion configured to limit insertion within the female member, and at least one fastener configured to mount the male member to one of the cab and the hood.

41. The vehicle of claim 40 wherein the female member comprises a guide member constructed and arranged to receive the male member elongate mating portion therein, with the male member enlarged shoulder portion in assembly being seating in engagement with a proximate end of the guide tube.

42. The vehicle of claim 35 wherein the mating members comprise two laterally spaced apart pairs of first and second mating members.

43. A hood hinge assembly for use in mounting a hood to a frame of a vehicle to provide a compliant relationship therebetween which allows at least fore and aft relative movement, comprising:
   a support member for mounting the hinge assembly to the frame;
   a rocker member pivotally connected to the support member along a first pivot axis;
   at least one resilient spacer member disposed between the rocker member and the support member so as to impart compliance therebetween;
   a pivot mount connected to the rocker member; said pivot mount serving to define a second pivot axis; and
   a hood connection bracket pivotally connected to the pivot mount.

44. The hood hinge assembly of claim 43 wherein the pivot mount and the hood connection bracket comprise a hinge assembly pivotally carried by the rocker member in compliant relation with the support member.

45. The hood hinge assembly of claim 43 wherein the at least one resilient spacer member comprises first and second ring-shaped elastomeric bodies.

46. The hood hinge assembly of claim 45 wherein one of the ring-shaped elastomeric bodies comprises a reduced diameter portion configured to be received within an enlarged bore of the rocker member along the first pivot axis.

47. The hood hinge assembly of claim 46 further comprising a rigid substantially cylindrical sleeve received within an inner diameter bore of each of the ring-shaped elastomeric bodies, the sleeve configured to receive a mounting bolt therethrough to form a first pivot along the first pivot axis.

48. A hood hinge assembly for use in mounting a hood to a frame of a vehicle, comprising:
   a support member for mounting the hinge assembly to the frame;
   a rocker member pivotally connected to the support member along a first pivot axis;
   a pivot mount connected to the rocker member; said pivot mount serving to define a second pivot axis;
   a hood connection bracket pivotally connected to the pivot mount for pivotal movement about the second pivot axis;
   said pivot mount including a retainer which is removable to allow disconnection of the hood connection bracket and any attached hood without disengaging the pivot mount from the rocker member.

49. A method involving a vehicle with a vehicle hood, frame and cab, for supporting the vehicle hood relative to the frame and the cab, to accommodate substantial relative movement between the frame and hood during travel of the vehicle upon a roadway, comprising the steps of:
   mounting frontal portions of the hood upon the frame using at least one compliant hood mounting assembly which allows substantial fore and aft relative movement between the hood and frame during travel of the vehicle without adjustment by an operator;
   having rearward portions of the hood be maintained in relatively coordinated positional relationship with respect to the cab;
   whereby the hood moves in substantially coordinated positional relationship with the cab and in substantially variable positional relationship relative to the frame to allow substantial relative movement therebetween in at least fore and aft directions during travel of the vehicle upon the roadway.

50. A method according to claim 49 and further comprising mechanically coupling rearward portions of the hood to the cab using a detachable coupling.

51. A method according to claim 49 and further comprising mechanically coupling rearward portions of the hood to the cab using a detachable coupling which couples in a manner which allows some relative positional movement between the hood and cab.

52. A method according to claim 49 and further comprising:
   mechanically coupling rearward portions of the hood to the cab using a detachable coupling which couples in a manner which allows some relative positional movement between the hood and cab;
   suspending the cab relative to the frame.

53. A method according to claim 49 and further comprising suspending the cab relative to the frame.

54. The method according to claim 49 further comprising:
   experiencing a force by the hood;
   moving the hood relative to the frame using the compliant hood mounting assembly and responsive to the force.

55. The method according to claim 54 further comprising reducing loading of the hood responsive to the moving.

56. The method according to claim 49 further comprising coupling a rocker member intermediate the hood and the frame to allow rocking action of the rocker member and compliancy between the hood and frame.

57. The method according to claim 49 further comprising:
   pivotally coupling a rocker member with the hood;
   pivotally coupling the rocker member with the frame.

58. The method according to claim 49 further comprising:
pivotally coupling a rocker member with the hood;
pivotally coupling the rocker member with the frame;
limiting rotational movement of the rocker member with respect to the frame.

59. The method according to claim 49 further comprising:
pivotally coupling a rocker member to the frame;
providing a resilient spacer intermediate the rocker member and the frame.

60. The method according to claim 49 further comprising:
pivotally coupling a rocker member to the hood;
providing a resilient spacer intermediate the rocker member and the hood.

61. The method according to claim 49 further comprising:
pivotally coupling a rocker member with the hood and the frame at first and second pivots, respectively;
providing at least one resilient member between the hood and frame to provide compliance in combination with said rocker member.

62. The method according to claim 49 further comprising:
pivotally coupling a rocker member with the hood and the frame at first and second pivots, respectively;
providing a resilient member between the rocker and hood;
providing a resilient member between the rocker and the frame.

63. The method according to claim 49 further comprising:
pivotally coupling a rocker member with the hood;
pivotally coupling the rocker member with a support member of the frame;
limiting rotational movement of the rocker member with respect to the frame;
providing a resilient spacer intermediate the rocker member and the support member;
providing compliance using the resilient spacer.

64. A hood mounting system for use in mounting a hood to a vehicle, the vehicle having a frame and a cab, comprising:
at least one hinge assembly mounted between frontal portions of the hood and frontal portions of the frame; said at least one hinge assembly having first and second parts which are capable of compliant relative movement therebetween in at least fore and aft directions; the hinge assembly comprises a support member for mounting the hinge assembly to the frame, a rocker member pivotally connected to the support member along a first pivot axis, a pair of resilient spacer members disposed between the rocker member and the support member so as to impart compliance therebetween, a bushing connected to the rocker member in spaced apart relation with the first pivot axis, and a hood connection bracket pivotally connected to the pivot mount to define a second pivot so as to support the mounting bracket pivotally therefrom and to form a hinge supported in compliant rockered relation therealong;
at least one pair of mating members, said at least one pair of mating members including a first mating member which is mounted to a rearward portion of the hood and a second mating member which is mounted upon the cab; said first and second mating members being detachable into disengaged relative positions to allow the hood to be opened and moved into engaged relative positions to allow the hood to be closed;
whereby the first and the second mating members provide engagement therebetween when in the engaged relative positions to thereby position the hood relative to the cab, and the at least one hinge assembly allows the hood to move in compliant relationship relative to the frame.

65. The hood mounting system of claim 64 wherein the bushing comprises an elastomeric bushing block configured to be mounted within a complementary recess of the rocker member, and a substantially cylindrical sleeve constructed and arranged to be received within the bushing block and configured to receive a second pivot further comprising a mounting bolt therethrough.

66. The hood mounting system of claim 64 wherein the rocker member comprises a substantially rigid member having a clevis-shaped upper portion defining a recess therealong configured to receive the bushing, a central portion having a bore for receiving the first pivot axis, and a bottom portion having a pair of heels disposed laterally of a central axis of the bore, the pair of heels constructed and arranged to engage with the support member when pivoted so as to limit the amount of pivotal rocker motion of the rocker member in relation to the support member.

67. The hood mounting system of claim 66 wherein the fore and aft movement of the second pivot, resulting at least in part from rocker motion of the rocker member, is limited by contact between the heels and the support to a maximum of about 1.5 inches.

68. The hood mounting system of claim 64 wherein the clevis-shaped upper member of the rocker member further comprises a yoke and a retainer removably mounted to the yoke for entrapping the bushing therebetween.

69. A hood mounting system for use in mounting a hood to a vehicle, the vehicle having a frame and a cab, comprising:
at least one hinge assembly mounted between frontal portions of the hood and frontal portions of the frame; said at least one hinge assembly having first and second parts which are capable of compliant relative movement therebetween in at least fore and aft directions;
at least one pair of mating members, said at least one pair of mating members including a first mating member which is mounted to a rearward portion of the hood and a second mating member which is mounted upon the cab; said first and second mating members being detachable into disengaged relative positions to allow the hood to be opened and moved into engaged relative positions to allow the hood to be closed; wherein the first and second mating members comprise a pair of respective mating male and female members, the male member comprises an elastomeric pin body having an elongate mating portion and an enlarged shoulder portion configured to limit insertion within the female member, and at least one fastener configured to mount the male member to one of the cab and the hood;
whereby the first and the second mating members provide engagement therebetween when in the engaged relative positions to thereby position the hood relative to the cab, and the at least one hinge assembly allows the hood to move in compliant relationship relative to the frame.

70. The hood mounting system of claim 69 wherein the female member comprises a guide member constructed and arranged to receive the male member elongate mating portion therein, with the male member enlarged shoulder portion in assembly being seating in engagement with a proximate end of the guide member.

* * * * *

UNITED STATES PATENT AND TRADEMARK OFFICE
CERTIFICATE OF CORRECTION

PATENT NO. : 5,890,556
DATED : April 6, 1999
INVENTOR(S) : Shearn et al.

It is certified that error appears in the above-identified patent and that said Letters Patent is hereby corrected as shown below:

Column 7, line 10, after "view", insert - - . - - .

Column 9, line 11, after "on", insert - - a threaded stem 152 extending from pin 130. - - .

Column 9, line 12, delete [An enlarged 152 extending from pin 130.].

Column 10, line 7, after "position," delete [is].

Signed and Sealed this

Fourteenth Day of December, 1999

Attest:

Q. TODD DICKINSON

*Attesting Officer*  *Acting Commissioner of Patents and Trademarks*